US008746752B2

(12) United States Patent
Hayashi et al.

(10) Patent No.: US 8,746,752 B2
(45) Date of Patent: Jun. 10, 2014

(54) JOINT AND SPACER USED THEREIN

(75) Inventors: Nobuhiko Hayashi, Yamagata (JP); Hajime Imura, Yamagata (JP)

(73) Assignee: Onda Mfg. Co., Ltd. (JP)

( * ) Notice: Subject to any disclaimer, the term of this patent is extended or adjusted under 35 U.S.C. 154(b) by 51 days.

(21) Appl. No.: 13/640,265

(22) PCT Filed: Feb. 22, 2012

(86) PCT No.: PCT/JP2012/054235
§ 371 (c)(1),
(2), (4) Date: Oct. 9, 2012

(87) PCT Pub. No.: WO2013/038724
PCT Pub. Date: Mar. 21, 2013

(65) Prior Publication Data
US 2013/0062877 A1  Mar. 14, 2013

(30) Foreign Application Priority Data
Sep. 14, 2011 (JP) ................. 2011-200917

(51) Int. Cl.
*F16L 17/00* (2006.01)
(52) U.S. Cl.
USPC ............................ 285/339; 285/247; 285/340
(58) Field of Classification Search
USPC ................. 285/339, 340, 307, 305, 247, 248
See application file for complete search history.

(56) References Cited

U.S. PATENT DOCUMENTS

| 6,851,728 B2 * | 2/2005 | Minami ........................ 285/339 |
| 7,240,925 B2 * | 7/2007 | Fukano et al. ................ 285/247 |
| 7,611,172 B2 * | 11/2009 | Baving et al. ................ 285/340 |
| 7,922,215 B2 * | 4/2011 | Salomon-Bahls et al. .... 285/339 |

(Continued)

FOREIGN PATENT DOCUMENTS

| JP | 2003-172490 A | 6/2003 |
| JP | 2008-25659 A | 2/2008 |
| JP | 2009-144740 A | 7/2009 |
| JP | 2012-2255 A | 1/2012 |

OTHER PUBLICATIONS

"International Application Serial No. PCT/JP2012/054235, International Search Report mailed May 22, 2012", 3 pgs.

(Continued)

*Primary Examiner* — Aaron Dunwoody
(74) *Attorney, Agent, or Firm* — Schwegman, Lundberg & Woessner, P.A.

(57) ABSTRACT

An inner tubular portion (15) and an outer tubular portion (16) form an insertion space (14) of a plastic pipe (11) and are integrally formed on a joint main body (13). A cap (29) is connected to the outer tubular portion (16) by projection-recess engagement. A retainer mechanism (27) of the plastic pipe (11) is provided between the outer tubular portion (16) and the cap (29). A cutout portion (20) is formed in the outer tubular portion (16), and a bulging engagement portion (24) is arranged on the cutout portion (20). The outer periphery of the bulging engagement portion (24) is connected to the cap (29) by the projection-recess engagement. A restricting portion is provided between the cutout portion (20) and the bulging engagement portion (24). The restricting portion is composed of a first tapered surface (21) and a second tapered surface (25). The first tapered surface (21) is provided on the cutout portion (20) and decreases in width toward the outer end. The second tapered surface (25) is provided on the bulging engagement portion (24) and engaged with the first tapered surface (21).

11 Claims, 13 Drawing Sheets

(56) References Cited

U.S. PATENT DOCUMENTS

| | | | |
|---|---|---|---|
| 8,181,997 B2* | 5/2012 | Wang | 285/314 |
| 8,608,205 B2* | 12/2013 | Lai | 285/39 |
| 2005/0035597 A1* | 2/2005 | Bamberger et al. | 285/340 |
| 2007/0057506 A1* | 3/2007 | Le Quere et al. | 285/322 |
| 2012/0086197 A1* | 4/2012 | Bauer et al. | 285/81 |
| 2013/0154258 A1* | 6/2013 | Schroter et al. | 285/305 |

OTHER PUBLICATIONS

"International Application Serial No. PCT/JP2012/054235, Written Opinion mailed May 22, 2012", 3 pgs.

\* cited by examiner

Fig.23
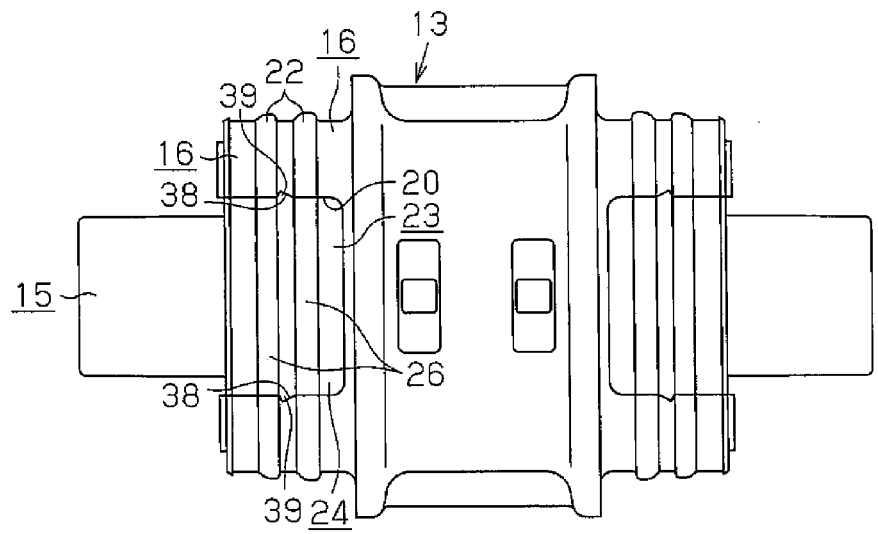
Fig.24(a)     Fig.24(b)
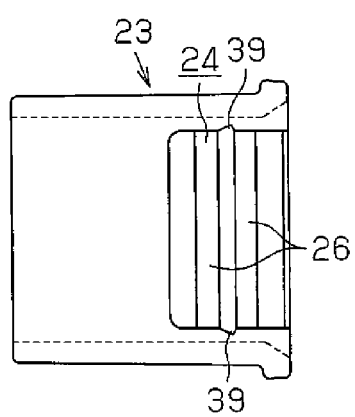     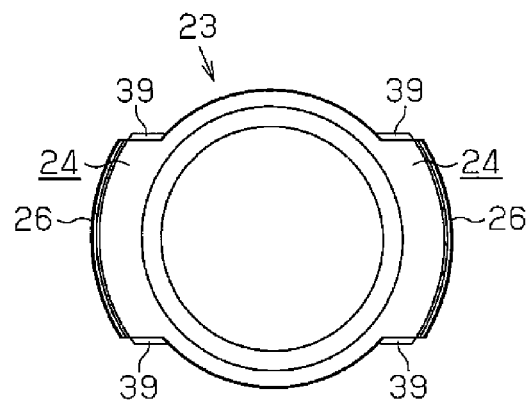
Fig.25
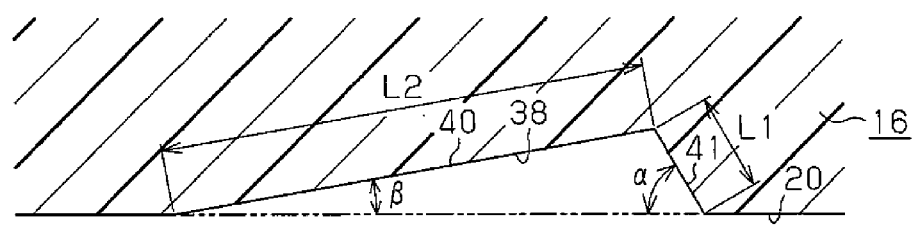

JOINT AND SPACER USED THEREIN

RELATED APPLICATIONS

This application is a nationalization under 35 U.S.C. 371 from International patent Application Ser. No. PCT/JP2012/0524235, filed Feb. 22, 2012, which claims the priority benefit of Japanese Patent Application No. 2011-200917, filed Sep. 14, 2011, the contents of which applications and publications are incorporated herein by reference in their entirety.

TECHNICAL FIELD

The present invention relates to a joint used in a piping system of a feed-water system or a hot-water supply system, and particularly to a joint that can retain a cap when a strong withdrawing force acts on a pipe inserted into an insertion space of a joint main body and to a spacer used therein.

BACKGROUND

In a prior-art joint used in a piping system of a feed-water system or a hot-water supply system, a pipe insertion space is formed between an inner tubular portion and an outer tubular portion extending in an axial direction of the joint main body, and a cap (lid) is fitted on the outside of the outer tubular portion. A retainer mechanism for retaining a pipe inserted into the insertion space is provided between the outer tubular portion and the cap. The pipe is retained by the retainer mechanism when a withdrawing force acts on the pipe.

A joint of this type has been proposed by the present applicant in Patent Document 1. The joint includes a joint main body having an insertion space (insertion chamber), into which the pipe is inserted and a cap (lid) to cover the insertion space. The joint main body and the cap are connected to each other at a joint portion, and a holding body is fitted into the outer periphery of the cap. The joint main body and the cap are locked by a serrated locking portion. A retainer ring for retaining the pipe inserted into the insertion space is provided between the outer tubular portion and the cap. According to this joint, since the holding body holds the cap and the joint portion to cover them, even when a withdrawing force acts on the pipe, the cap and the joint portion is maintained in the original state.

PRIOR ART DOCUMENT

Patent Document

Patent Document 1: Japanese Laid-Open Patent Publication No. 2008-25659

SUMMARY OF THE INVENTION

However, in the prior-art joint described in Patent Document 1, when a strong withdrawing force or a withdrawing force based on a strong impact caused by a water hammer acts on the pipe inserted into the insertion space, a large withdrawing force acts on the cap through the retainer ring. In this case, since the joint main body and the cap are formed of plastic, the serrated locking portion is subjected to a grinding-like action and the cap moves to come off. There is a problem that, if a larger withdrawing force continuously acts on the pipe, there is a risk of engagement in the locking portion being released, the cap coming out of the joint main body, and the pipe becoming disconnected from the joint.

Accordingly, it is an objective of the present invention to provide a joint that maintains attachment of the cap and retains the pipe when a withdrawing force acts on the pipe, and a spacer used therein.

To achieve the foregoing objective and in accordance with one aspect of the present invention, a joint is provided that includes a joint main body, an inner tubular portion and an outer tubular portion, which are formed in the joint main body, a cap, and a retainer mechanism. The inner tubular portion and the outer tubular portion form an insertion space into which a pipe is inserted. The cap is fitted on the outside of the outer tubular portion and connected thereto by projection-recess engagement. The retainer mechanism retains the pipe and is provided between the outer tubular portion and the cap. A cutout portion is formed in the outer tubular portion. An engagement member for being engaged with the cutout portion is provided. The engagement member is connected to the cap at an outer peripheral portion thereof by the projection-recess engagement. A restricting portion for preventing the cap from coming undone is provided between the cutout portion and the engagement member.

The restricting portion is preferably composed of a first tapered surface provided on the cutout portion and whose width becomes smaller toward an outer end of the cutout portion and a second tapered surface provided on the engagement member and engaged with the first tapered surface of the cutout portion.

The cutout portion of the outer tubular portion is preferably one of two cutout portion that are provided at opposite positions separated by 180 degrees, and the cutout portions are preferably configured such that the engagement member is engaged with both cutout portions.

The joint main body, in which the inner tubular portion and outer tubular portion are formed, and the engagement member are preferably made of plastic.

The joint preferably includes a spacer, which is located between the pipe and the outer tubular portion when the pipe is inserted into the insertion space, and the engagement member is preferably provided on the spacer.

A spacer used in the joint described above is provided. The spacer is configured to be located between the outer tubular portion and the pipe inserted into the insertion space. The spacer is characterized by a guided portion, which is engaged with a guide portion provided on an inner peripheral surface of the outer tubular portion and guides the engagement member to the cutout portion.

The guide portion is preferably composed of a projection and the guided portion is composed of a groove.

A tapered groove whose width expands toward an inner end is preferably formed on an inner end portion of the guided groove.

Effects of the Invention

According to the present invention, the following effects are produced.

In a joint of the present invention, an inner tubular portion and an outer tubular portion forming an insertion space for a pipe are formed in a joint main body. The joint is provided with a cap fitted on the outside of the outer tubular portion and connected to the outer tubular portion by projection-recess engagement. A retainer mechanism of a cap is provided between the outer tubular portion and the cap. A cutout portion is formed in the outer tubular portion. An engagement member engaged with the cutout portion is arranged, and the engagement member is connected to the cap by the projection-recess engagement on the outer peripheral portion thereof. A restricting portion for preventing the cap from coming undone is provided between the cutout portion and the engagement member.

Thus, when a withdrawing force acts on the pipe, a force in a withdrawing direction acts on the cap through the retainer mechanism, while movement of the engagement member engaged with the cutout portion in the outer tubular portion is restricted by the restricting portion. Therefore, since the engagement member is held by the outer tubular portion, the cap connected to the engagement member by the projection-recess engagement is also held to be positioned. As a result, the retainer mechanism is held as it is, and disconnection of the pipe from the joint is avoided.

Thus, according to the joint of the present invention, effects are produced that, when the withdrawing force acts on the pipe, attachment of the cap is maintained, and also the pipe is retained.

BRIEF DESCRIPTION OF THE DRAWINGS

FIG. 23 is a front view illustrating a state where a second engagement projecting spot of the bulging engagement portion of the spacer is engaged with the second engagement recess spot in the cutout portion of the joint of FIG. 22;

FIG. 24(a) is a front view illustrating the spacer having the bulging engagement portion;

FIG. 24(b) is a right side view illustrating the spacer of FIG. 24(a); and

FIG. 25 is a partially enlarged sectional view illustrating the second engagement recess spot formed in the cutout portion of the outer tubular portion.

DETAILED DESCRIPTION (First Embodiment)

A first embodiment according to the present invention will be described below by referring to FIGS. 1 to 8.

Figure 1:
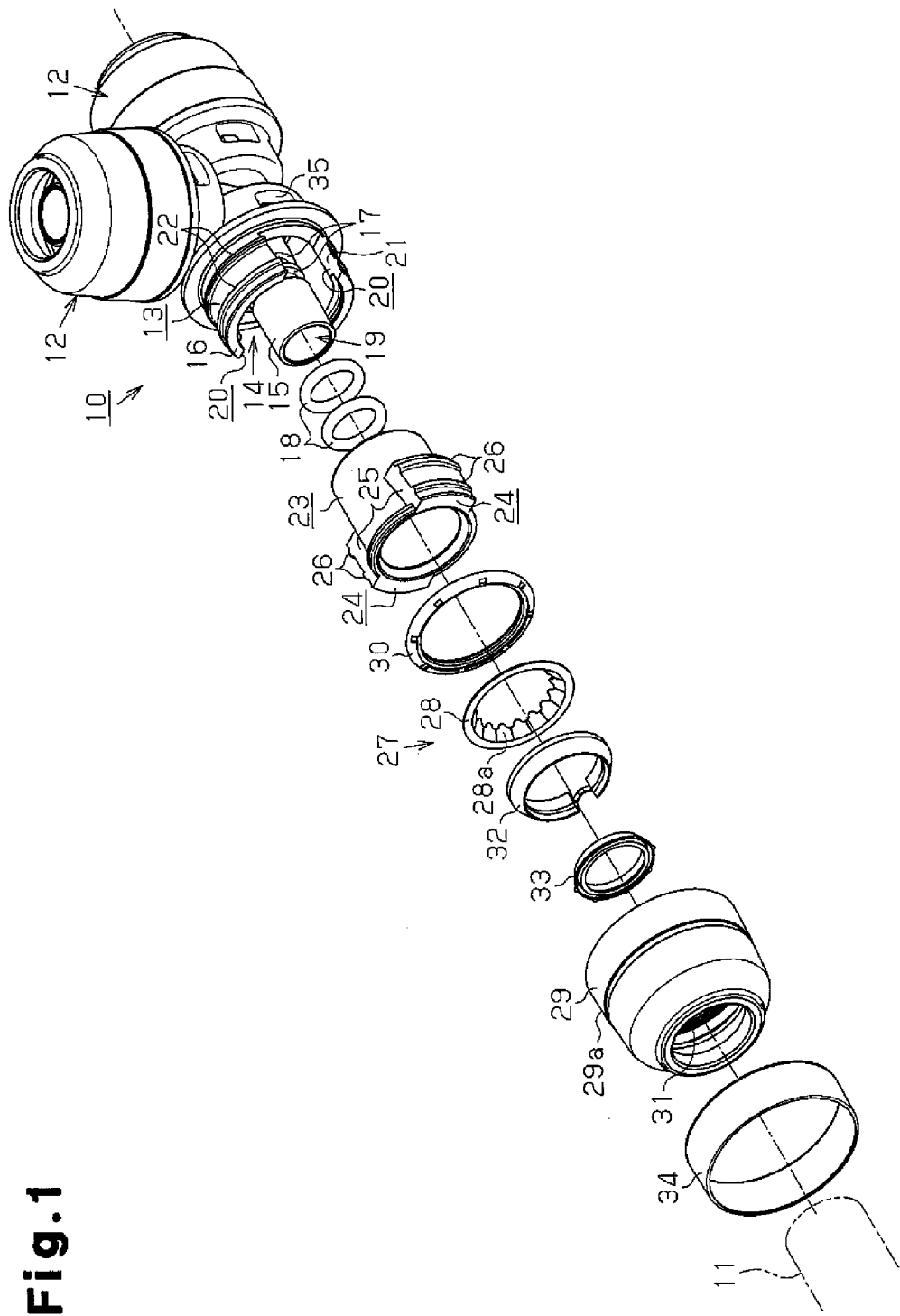
FIG. 1 is an exploded perspective view illustrating a joint according to a first embodiment of the present invention.
Figure 2:
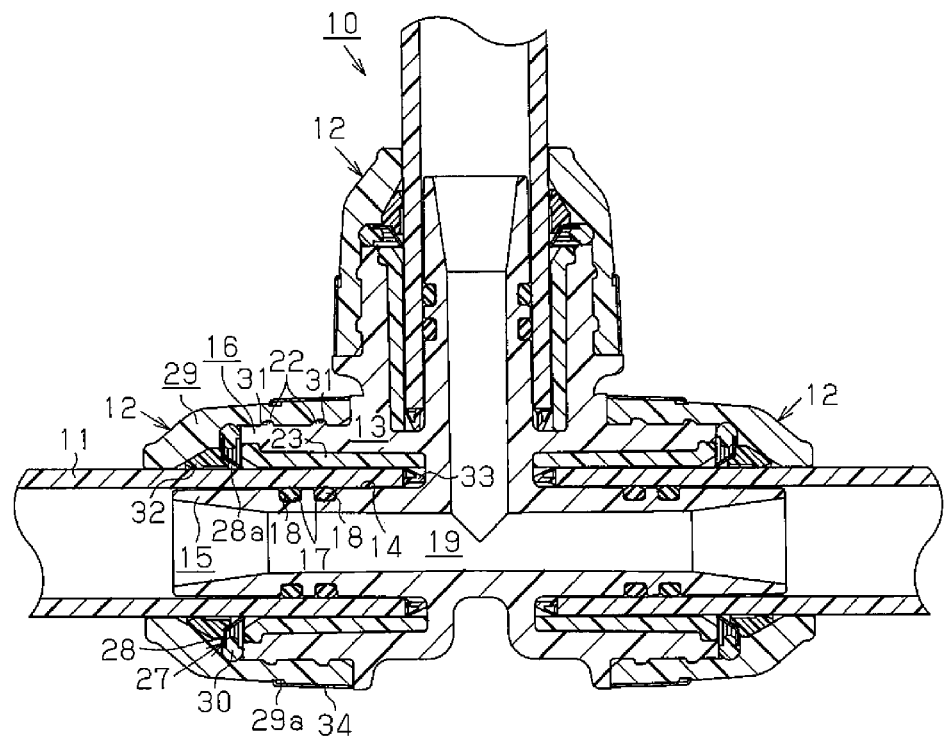
FIG. 2 is a longitudinal cross-sectional view illustrating the joint of FIG. 1.
Figure 3:
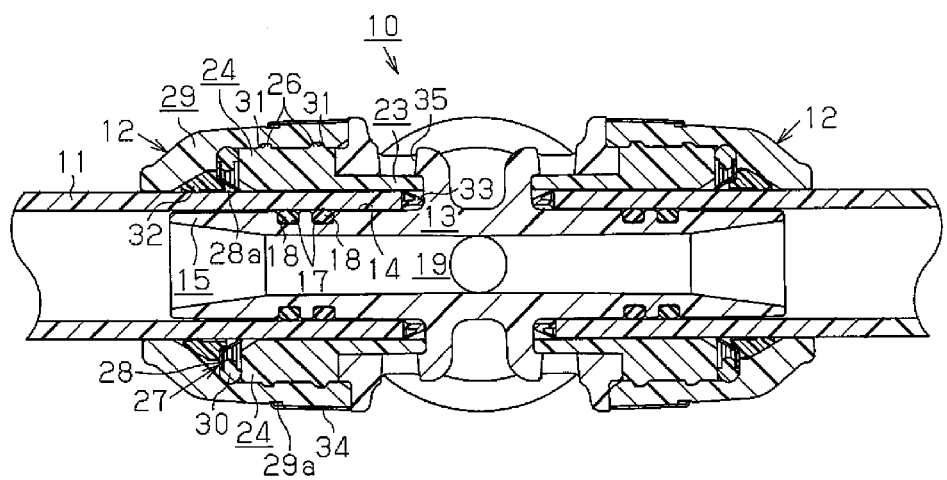
FIG. 3 is a transverse cross-sectional view illustrating the joint of FIG. 1.

As illustrated in FIGS. 1 to 3, a joint 10 includes a joint main body 13. The joint main body 13 has three cylindrical pipe joint portions 12 for connecting a plastic pipe 11. The three pipe joint portions 12 are provided to extend in three directions forming an inverted T-shape. Each of the pipe joint portions 12 is formed of plastic containing elastomer such as polyphenylene sulfide (PPS) and the like mixed with rubber. The plastic pipe 11 is formed of a synthetic resin such as polyolefin (cross-link polyethylene, polybutene) and the like. Since the pipe joint portions 12 all have the same configuration, one of the pipe joint portions 12 will be described.

In the joint main body 13, an inner tubular portion 15 and an outer tubular portion 16 forming an insertion space 14, into which the plastic pipe 11 is inserted are integrally formed. A pair of fitting grooves 17 forming an annular shape is juxtaposed in the axial direction of the joint main body 13 in the outer peripheral surface of the inner tubular portion 15, and sealing members 18, each being made of ethylene propylene diene monomer rubber (EPDM), are fitted in these fitting grooves 17, respectively. It is so configured that, by this sealing member 18, a space between the inner peripheral surface of the plastic pipe 11 and the outer peripheral surface of the inner tubular portion 15 is held in a water-tight manner when the plastic pipe 11 is inserted into the insertion space 14. The pair of fitting grooves 17 is provided to be located closer to the inner end than the outer end portion of the outer tubular portion 16 so that the length of the joint main body 13 can be designed short. The inside space of the inner tubular portion 15 is a passage 19 through which a fluid such as water flows.

A pair of cutout portions 20 formed in the U-shape is provided in the outer tubular portion 16 in the axial direction of the joint main body 13 from the outer end thereof at opposite positions separated by 180 degrees. A first tapered surface 21 whose width gets smaller toward the outer end is formed on both side faces of each of the cutout portions 20. Moreover, two locking projections 22 are provided on the outer peripheral surface of the outer tubular portion 16 to extend in the arc shape in a direction orthogonal to the axial direction of the joint main body 13 and to project at a certain interval in the axial direction.

A cylindrical spacer 23 is inserted into the insertion space 14. When the plastic pipe 11 is inserted in the insertion space 14, the spacer 23 is located between the plastic pipe 11 and the outer tubular portion 16. This spacer 23 is formed of a transparent plastic such as polyamide resin (nylon 12) and the like so that the inside of the spacer 23 can be seen through. This spacer 23 also prevents dust from entering the insertion space 14.

Figure 4:
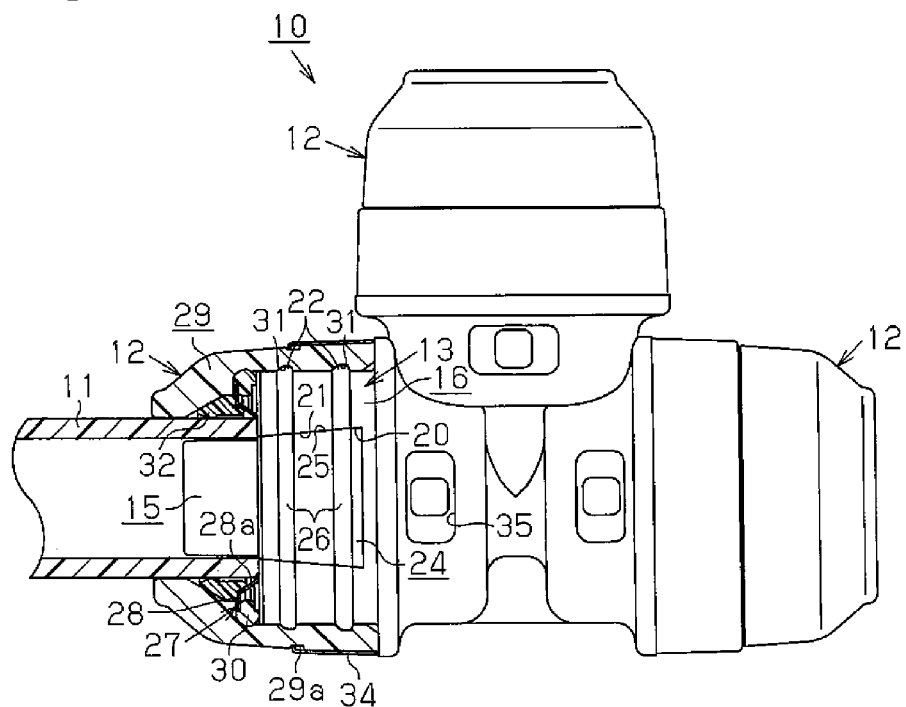
FIG. 4 is a front view, with a part cut away, illustrating the joint in which a pipe is inserted.
Figure 6:
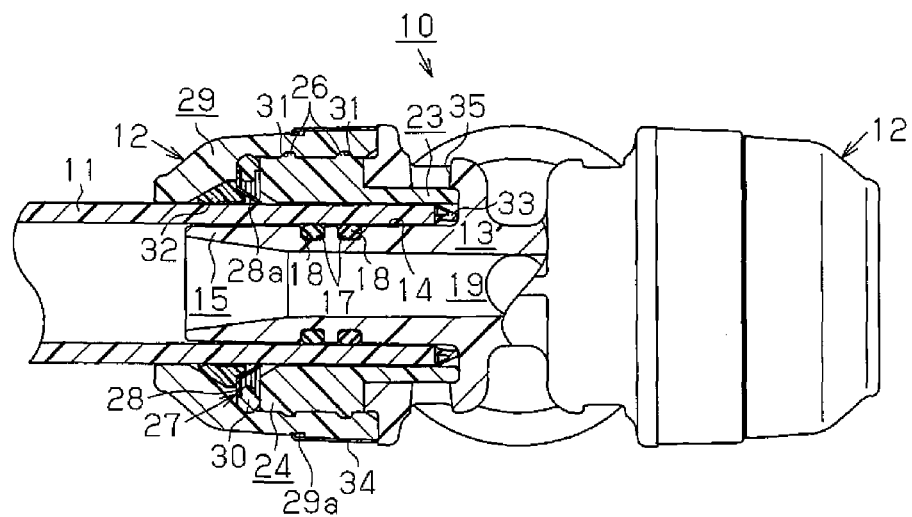
FIG. 6 is a bottom view, with a part cut away, illustrating the joint in the state of FIG. 4.

A pair of bulging engagement portions 24 as engagement members is formed at opposite positions separated by 180 degrees on the outer peripheral surface of the outer end portion of this spacer 23. A second tapered surface 25 whose width gets smaller toward the outer end and comes in close contact with the first tapered surface 21 of the cutout portion 20 is provided on both sides of the bulging engagement portion 24. As illustrated in FIGS. 4 and 6, the inner end portion of the spacer 23 is inserted into the insertion space 14, and the bulging engagement portion 24 can be fitted into the cutout portion 20 of the outer tubular portion 16 to widen the outer tubular portion 16. Moreover, two locking projections 26 are formed on the outer peripheral surface of the bulging engagement portion 24 to project at the same positions as the two locking projections 22 of the outer tubular portion 16 when the bulging engagement portion 24 is fitted in the cutout portion 20 of the outer tubular portion 16.

A retainer mechanism 27 for retaining the plastic pipe 11 inserted into the insertion space 14 is provided on the side closer to the outer end than the outer tubular portion 16 and the spacer 23. A retainer ring 28 constituting this retainer mechanism 27 is formed of metal such as stainless steel, and a retainer piece 28a is formed on the inner peripheral portion thereof to project with inclination toward the inner end. This retainer piece 28a bites into the outer peripheral portion of the plastic pipe 11 inserted into the insertion space 14 and retains the plastic pipe 11. This retainer ring 28 is attached between a cap 29 made of PPS to be fitted over the outer tubular portion 16 and a pressing ring 30 made of polyoxymethylene (POM).

Regarding the cap 29, two locking recesses 31 formed in the inner peripheral surface thereof are locked by the two locking projections 22 of the outer tubular portion 16 and the two locking projections 26 of the bulging engagement portion 24. As a result, the cap 29 is connected to the outer tubular portion 16 and the spacer 23 by projection-recess engagement. The first tapered surface 21 formed on the cutout portion 20 of the outer tubular portion 16 and the second tapered surface 25 formed on the bulging engagement portion 24 constitute a restricting portion which prevents the cap 29 from coming undone.

A split ring 32 made of PPS is located between the retainer ring 28 and the cap 29 and is configured to hold an inclination angle of the retainer piece 28a. The retainer ring 28, the pressing ring 30, the cap 29, and the split ring 32 constitute the retainer mechanism 27 of the plastic pipe 11.

An insertion guide 33 made of polypropylene (PP) which is pressed by a distal end surface of the plastic pipe 11 and guides insertion of the plastic pipe 11 is arranged in the insertion space 14. A cap cover 34 made of stainless steel is attached on the outer peripheral surface of the cap 29 by locking an end portion of the cap cover 34 to a mounting groove 29a on the outer periphery of the cap 29 to hold and retain the cap 29 with the outer tubular portion 16. A check hole 35 for checking the presence of the plastic pipe 11 inserted into the insertion space 14 is formed in the inner end portion of the joint main body 13 to extend through the joint main body 13.

The joint main body 13 having the above-described outer tubular portion 16 and the inner tubular portion 15 can be molded by using a mold for injection molding provided with a split mold, a slide core, and an insert and by injecting molten resin. The spacer 23 having the bulging engagement portion 24 can be also molded similarly by using the mold for injection molding provided with a split mold and a slide core.

Operation of the joint 10 configured as above will be described below.

As illustrated in FIGS. 1, 4, and 6, when the inner end portion of the spacer 23 is inserted into the insertion space 14 of the joint main body 13 and the bulging engagement portion 24 on the outer end of the spacer 23 is inserted to widen the outer end of the outer tubular portion 16 and to engage with the cutout portion 20 of the outer tubular portion 16, the second tapered surface 25 of the bulging engagement portion 24 is brought into close contact with the first tapered surface 21 of the cutout portion 20 of the outer tubular portion 16. In that state, the retainer mechanism 27 is arranged on the outer end of the outer tubular portion 16 and the cap 29 is fitted over the outer tubular portion 16 and thus, the locking recesses 31 in the inner peripheral surface of the cap 29 is locked and attached by the locking projections 22 on the outer peripheral surface of the outer tubular portion 16 and the locking projections 26 on the outer peripheral surface of the bulging engagement portion 24. Moreover, by fitting the cap cover 34 at the outside of the outer periphery of the cap 29, expansion of the diameter of the cap 29 is suppressed.

After that, when the plastic pipe 11 is inserted into the insertion space 14 of the joint 10, the plastic pipe 11 is guided by the insertion guide 33 and located between the inner tubular portion 15 of the joint main body 13 and the spacer 23. Also, the plastic pipe 11 is held by the retainer mechanism 27 to prevent the plastic pipe 11 from disconnecting from the joint 10.

Figure 5:
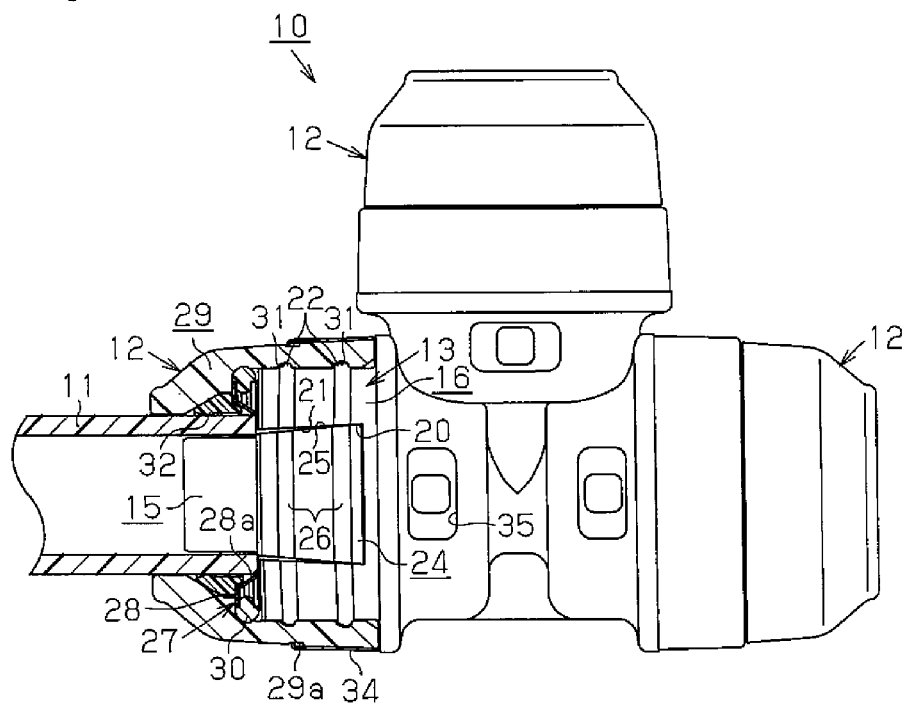
FIG. 5 is a front view, with a part cut away, illustrating a state where a withdrawing force acts on the pipe from the state of FIG. 4.
Figure 7:
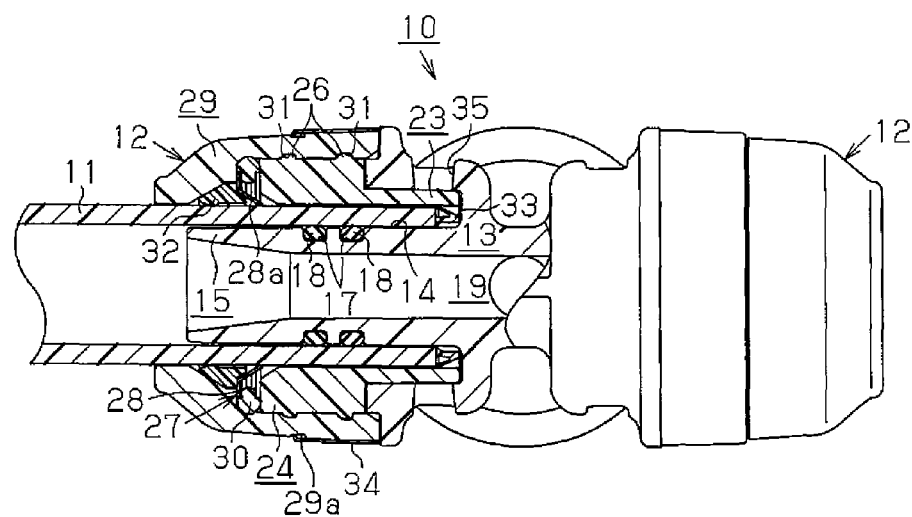
FIG. 7 is a bottom view, with a part cut away, illustrating the joint in the state of FIG. 5.
Figure 8:
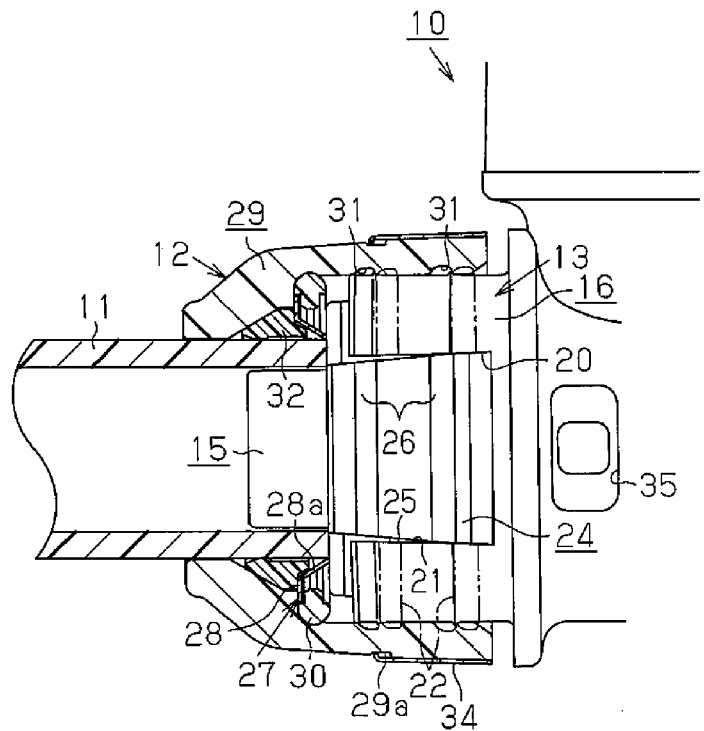
FIG. 8 is an enlarged front view, with a part cut away, illustrating the joint when a strong withdrawing force further acts on the pipe from the state of FIG. 5 in an enlarged manner.

If a withdrawing force acts on the plastic pipe 11 in that state, the withdrawing force makes the retainer piece 28a of the retainer ring 28 bite into the plastic pipe 11, whereby the withdrawing force is transmitted to the cap 29, as illustrated in FIGS. 5 and 7. As a result, the cap 29 slightly moves in a direction toward the outer end, which is a withdrawing direction of the plastic pipe 11. Therefore, the locking projections 22 on the outer peripheral surface of the outer tubular portion 16 are ground by the locking recesses 31 in the inner peripheral surface of the cap 29, and locking force between the locking recesses 31 and the locking projections 22 lowers. In this case, if a larger withdrawing force acts on the plastic pipe 11, as illustrated in FIG. 8, the locking recesses 31 of the cap 29 comes undone toward the outer end from the original position of the locking projections 22 of the outer tubular portion 16 indicated by a two-dot chain line in FIG. 8. That is, the locking projections 22 of the outer tubular portion 16 are ground by the locking recesses 31 of the cap 29 and are lost, and the locking relationship between the locking projections 22 and the locking recesses 31 is lost.

However, the joint 10 of this embodiment is configured such that the bulging engagement portion 24 of the spacer 23 is inserted therein to be engaged with the cutout portion 20 of the outer tubular portion 16, and the first tapered surface 21 of the cutout portion 20 and the second tapered surface 25 of the bulging engagement portion 24 are engaged with each other to constitute the restricting portion. Thus, if the bulging engagement portion 24 acts to move toward the outer end, since the widths of the first tapered surface 21 and the second tapered surface 25 are set to become smaller toward the outer end, engagement of the second tapered surface 25 with the first tapered surface 21 is further enhanced. Therefore, the bulging engagement portion 24 does not come undone from the cutout portion 20 of the outer tubular portion 16, the locking state between the locking projections 26 on the outer periphery of the bulging engagement portion 24 and the locking recesses 31 in the inner periphery of the cap 29 is maintained, and the cap 29 is retained and held by the joint main body 13.

The advantages achieved by the above-described first embodiment will be described below.

(1) In the joint 10 of the first embodiment, the cutout portion 20 is formed in the outer tubular portion 16 of the joint main body 13, and the bulging engagement portion 24 engaged with the cutout portion 20 is arranged. The bulging engagement portion 24 is connected to the cap 29 by the projection-recess engagement with the outer peripheral portion of the bulging engagement portion 24, and the restricting portion for restricting the cap 29 from coming undone is provided between the cutout portion 20 and the bulging engagement portion 24.

Therefore, when a withdrawing force acts on the plastic pipe 11, a force in the withdrawing direction acts on the cap 29 through the retainer mechanism 27, while movement of the bulging engagement portion 24 engaged with the cutout portion 20 of the outer tubular portion 16 is restricted by the restricting portion. Therefore, since the bulging engagement portion 24 is held in the outer tubular portion 16, the cap 29 connected to the bulging engagement portion 24 by the projection-recess engagement is also held. As a result, the retainer mechanism 27 is held as it is, and disconnection of the plastic pipe 11 from the joint 10 is avoided.

Thus, according to the joint 10 of this embodiment, such advantages can be achieved that, when the withdrawing force acts on the plastic pipe 11, attachment of the cap 29 can be maintained and also, the plastic pipe 11 can be retained.

(2) The restricting portion is formed of the first tapered surface 21 provided on the cutout portion 20 and having a width getting smaller toward the outer end and the second tapered surface 25 provided on the bulging engagement portion 24 and engaged with the first tapered surface 21 of the cutout portion 20. Thus, the configuration of the restricting portion can be simplified, and the cap 29 is effectively prevented from coming undone.

(3) The pair of cutout portions 20 of the outer tubular portion 16 is provided at opposite positions separated by 180 degrees and is configured such that the bulging engagement portion 24 is engaged with both cutout portions 20. Therefore, the cap 29 is prevented from coming undone by the restricting portion with a good balance and in a stable state.

(4) The bulging engagement portion 24 is provided at the spacer 23 located between the plastic pipe 11 and the outer tubular portion 16 when the plastic pipe 11 is inserted into the insertion space 14. Thus, there is no need to provide the bulging engagement portion 24 as a new member, the configuration can be simplified and the bulging engagement portion 24 can be obtained at the same time as the spacer 23 when the spacer 23 is manufactured.

(5) The joint main body 13, in which the inner tubular portion 15 and the outer tubular portion 16 are integrally formed, and the bulging engagement portion 24 are formed of plastic. Thus, the outer tubular portion 16 can be deflected and deformed to fit the bulging engagement portion 24 in the cutout portion 20 of the outer tubular portion 16.

(Second Embodiment)

A second embodiment according to the present invention will now be described by referring to FIGS. 9 to 18. In this second embodiment, portions different from those in the first embodiment will be mainly described, and explanation will be omitted for the same portions.

Figure 9:
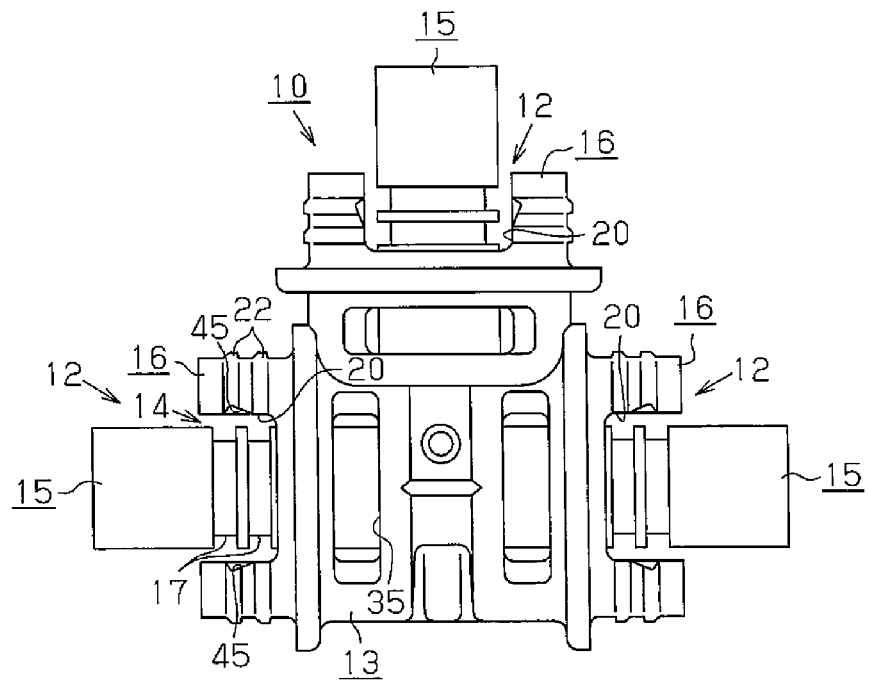
FIG. 9 is a front view of a joint according to a second embodiment of the present invention, illustrating a state before an engagement member is attached to an outer tubular portion.
Figure 10:
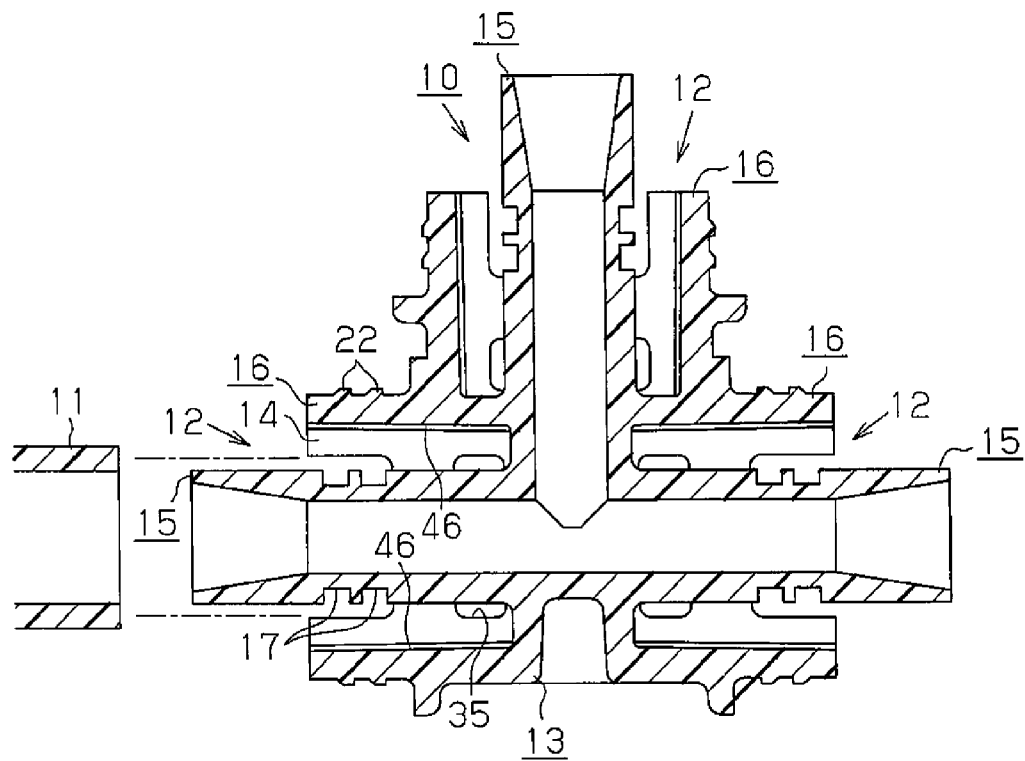
FIG. 10 is a longitudinal cross-sectional view illustrating the joint.
Figure 11:
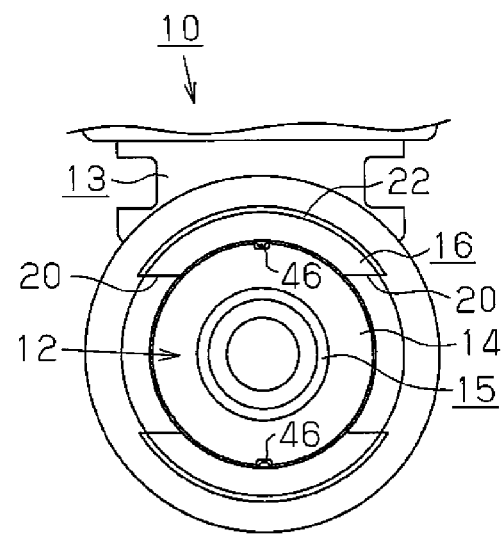
FIG. 11 is a side view illustrating a pair of guiding projections provided on an inner peripheral surface of the outer tubular portion of the joint.

As illustrated in FIGS. 9 to 11, the joint 10 has three pipe joint portions 12 extending in three directions for connecting the plastic pipe 11. A pair of cutout portions 20 is formed on the outer tubular portion 16 of each of the pipe joint portions 12 at opposite positions (right and left positions in FIG. 11). As illustrated in FIG. 9, each of the cutout portions 20 is formed in the U-shape at front view and both sides extend in parallel with the axial direction of the outer tubular portion 16. A locking recess spot 45 recessed in the shape of a mountain on front view is provided as a restricting portion at opposite positions each on both sides of the cutout portions 20. Thus, the outer tubular portion 16 is divided by the cutout portions 20 in the circumferential direction, and non-cutout portions are arranged at opposite positions.

Figure 12:
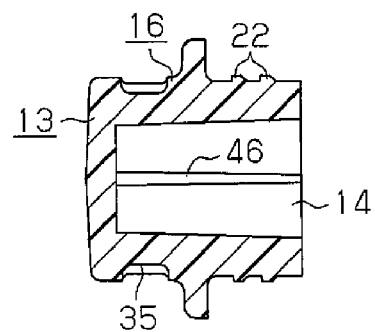
FIG. 12 is a partially transverse cross-sectional view illustrating the guiding projections on the inner peripheral surface of the outer tubular portion of the joint.
Figure 13:
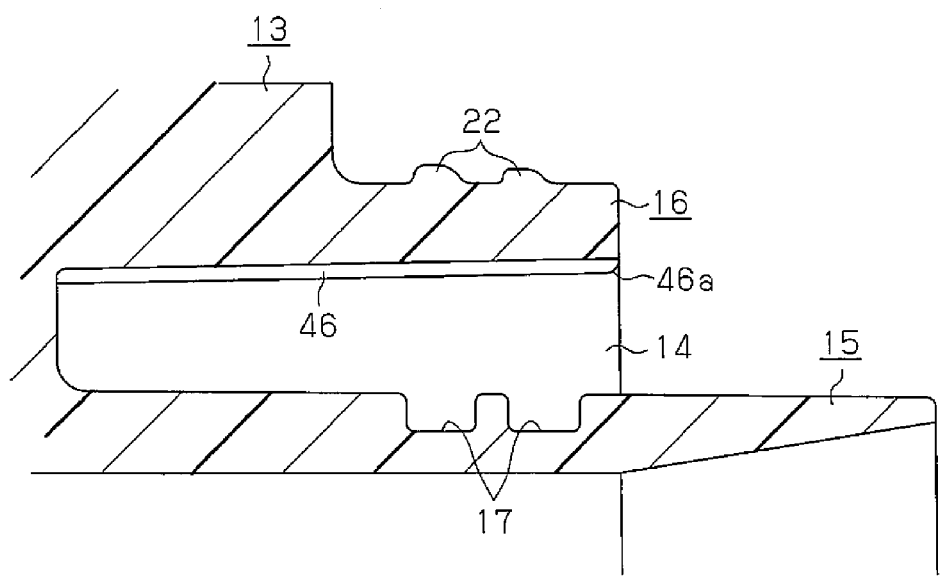
FIG. 13 is a partially enlarged longitudinal cross-sectional view illustrating the guiding projections on the inner peripheral surface of the outer tubular portion of the joint.

As illustrated in FIGS. 11 to 13, a guiding projection 46 as a guide portion is formed having a substantially semi-columnar section at opposite positions on the inner peripheral surface of the outer tubular portion 16 (upper and lower positions in FIG. 11) and the guiding projection 46 extends straight from the outer end portion to the inner end portion of the outer tubular portion 16. As illustrated in FIG. 12, this guiding projection 46 is formed in a slightly tapered manner to be narrower in the outer end portion and wider in the inner end portion. As illustrated in FIG. 13, a guiding end portion 46a chamfered having an arcuate section is formed on the outer end portion of the guiding projection 46.

Figure 14:
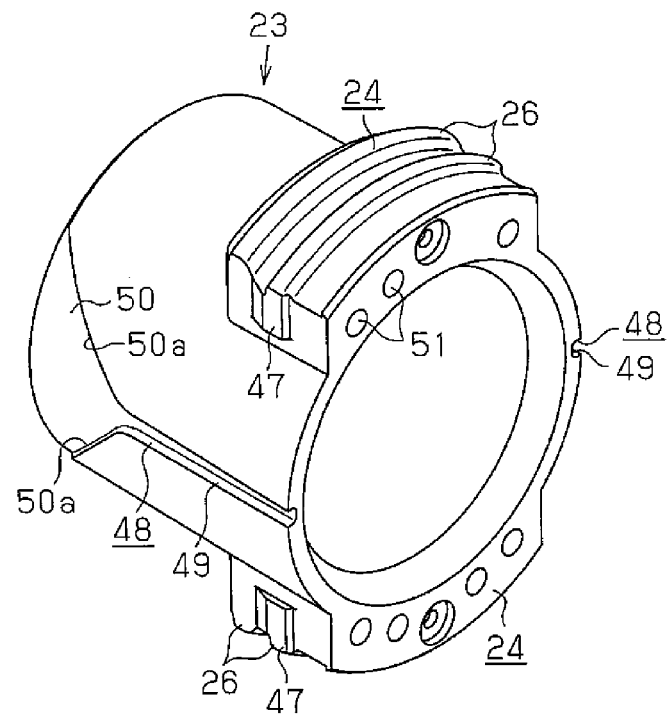
FIG. 14 is a perspective view illustrating a spacer inserted into an insertion space of the joint.

As illustrated in FIG. 14, the spacer 23 is formed cylindrically and is located between the plastic pipe 11 inserted into the insertion space 14 of the joint 10 and the outer tubular portion 16. This spacer 23 is molded by the injection molding method using nylon 12 as polyamide resin.

The pair of bulging engagement portions 24 as engagement members is provided to project at the opposite positions on the outer end portion of the spacer 23, and the bulging engagement portions 24 are configured to be engaged with the cutout portions 20 of the outer tubular portion 16. A locking projecting spot 47 forming the shape of a mountain at front view is provided as a restricting portion each on both sides of each of the bulging engagement portions 24, the locking projecting spots 47 are engaged with the locking recess spots 45 of the outer tubular portion 16, respectively, and the bulging engagement portions 24 of the spacer 23 is prevented from coming undone from the cutout portions 20 of the outer tubular portion 16.

Figure 15:
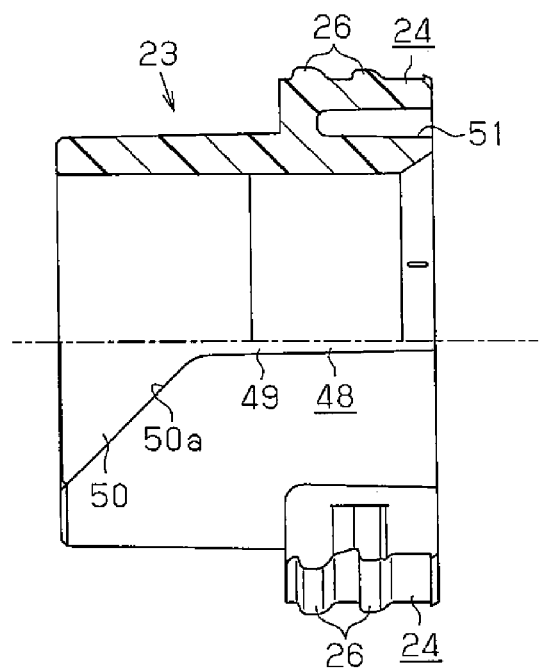
FIG. 15 is a half cross-sectional view illustrating a guided groove of the spacer.

Guided grooves 48 as guided portions are recessed to oppose each other in portions where the bulging engagement portions 24 are not provided on the outer peripheral surface of the spacer 23. Each guided groove 48 includes a linear groove 49 formed having a U-shaped section on the outer end and extending linearly in the axial direction of the spacer 23 and a tapered groove 50 continuing to the linear groove 49 on the inner end and gradually expanding in width toward the inner end. The linear groove 49 is formed in the tapered shape in which the inner end is slightly wider in correspondence with the guiding projections 46 of the outer tubular portion 16 so that the guiding projections 46 are fitted therein. As illustrated in FIG. 15, the tapered groove 50 has its both inclined edge portions 50a extending in a direction inclined by 45 degrees with respect to the axial direction of the spacer 23.

Then, particularly, this tapered groove 50 in the guided groove 48 guides insertion of the spacer 23 into the insertion space 14 of the joint 10 and facilitates engagement of the bulging engagement portion 24 of the spacer 23 with respect to the cutout portion 20 of the outer tubular portion 16. The two locking projections 26 extending in parallel in the circumferential direction are provided on the outer peripheral surface of the bulging engagement portion 24. A plurality of thinned holes 51 are recessed in the outer end face of the bulging engagement portion 24 so that sink of the bulging engagement portion 24 can be prevented and material can be saved.

Figure 17A:
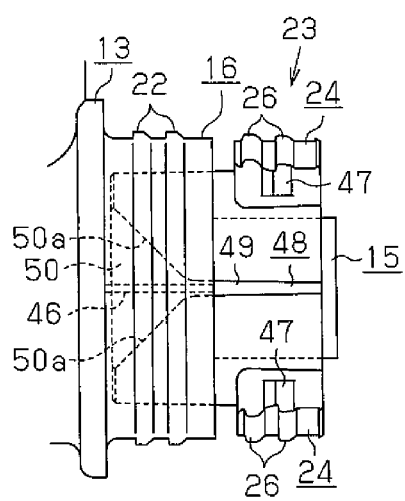
FIG. 17(a) is a front view of an essential part illustrating a state where a part of the spacer is inserted into the outer tubular portion of the joint.

As illustrated in FIG. 17(a), when the spacer 23 is inserted into the insertion space 14 of the joint 10, the guiding projection 46 of the outer tubular portion 16 fits into the tapered groove 50 of the guided groove 48 and moreover, the guiding projection 46 fits into the linear groove 49 and insertion of the spacer 23 is guided. Thus, the bulging engagement portion 24 of the spacer 23 is led to the cutout portion 20 of the outer tubular portion 16.

Operation of the joint 10 and the spacer 23 configured as above will now be described.

Figure 16:
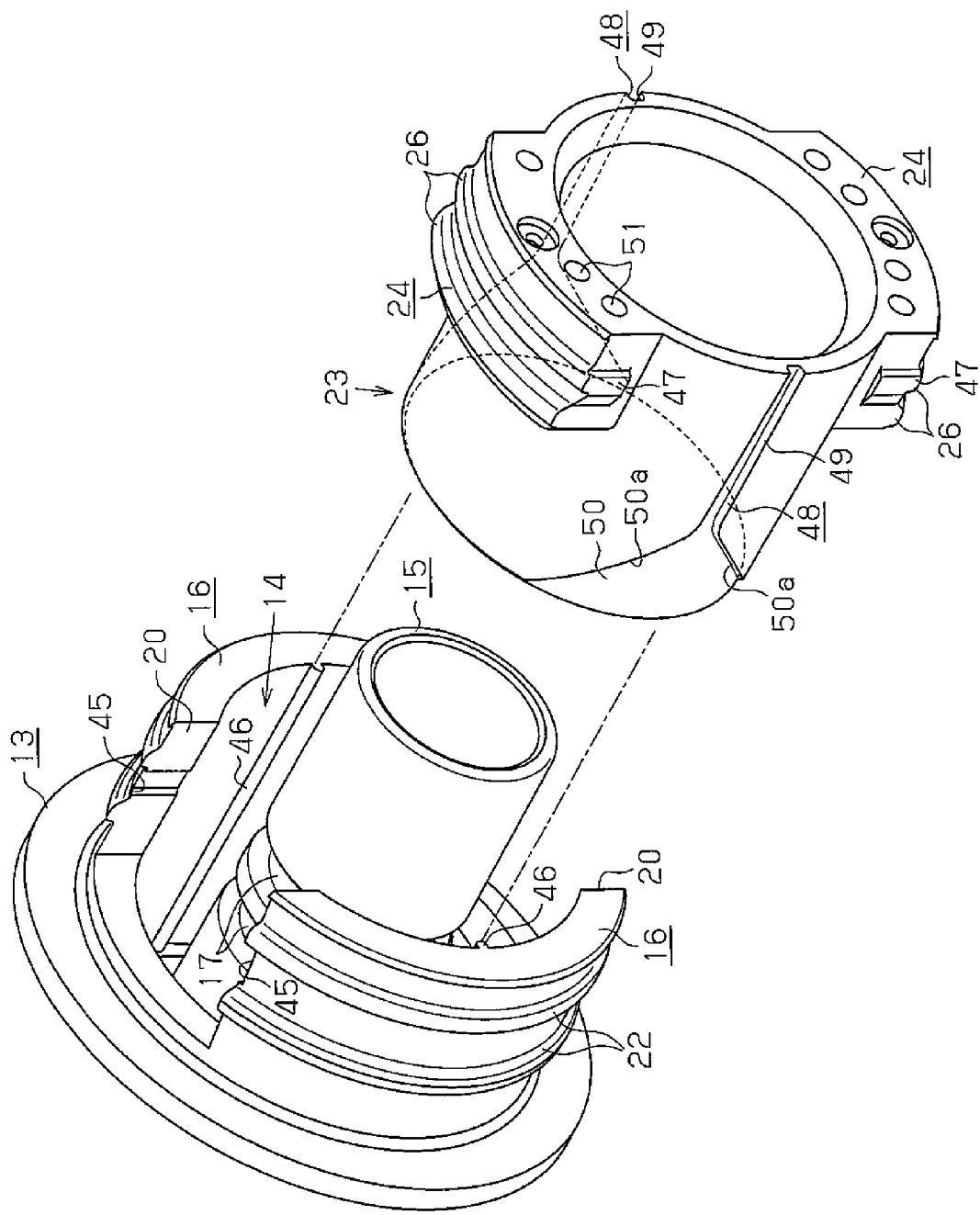
FIG. 16 is an exploded perspective view illustrating a state before the spacer is assembled to the outer tubular portion of the joint.

When the spacer 23 is to be attached to the joint 10 as illustrated in FIG. 16, positioning in the circumferential direction is performed so that the bulging engagement portion 24 of the spacer 23 opposes the cutout portion 20 of the outer tubular portion 16 of the joint 10, and the spacer 23 is positioned in front of the outer tubular portion 16. By inserting the spacer 23 in the insertion space 14 of the joint 10 in that state, the guiding projection 46 of the outer tubular portion 16 fits into the tapered groove 50 of the spacer 23, followed by the linear groove 49, and the insertion of the spacer 23 is guided as illustrated in FIG. 17(a). At this time, since the guiding end portion 46a having an arcuate section is provided on the outer end portion of the guiding projection 46 of the outer tubular portion 16, when the inner end portion of the spacer 23 is to be inserted into the outer end portion of the outer tubular portion 16, the spacer 23 can be inserted smoothly.

Figure 17B:
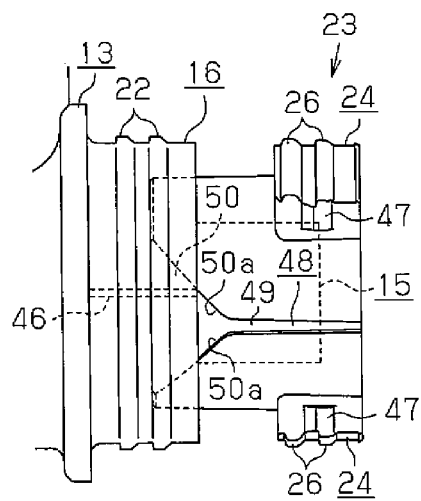
FIG. 17(b) is a front view of an essential part illustrating a state where the spacer is inserted in a state shifted in the circumferential direction when the spacer is inserted.

In this case, the position in the circumferential direction of the spacer 23 might be shifted, that is, the position of the linear groove 49 of the spacer 23 might not match the position of the guiding projection 46 of the outer tubular portion 16. In that case, as illustrated in FIG. 17(b), the spacer 23 is inserted into the insertion space 14 of the joint 10 while rotating circumferentially so that the guiding projection 46 of the outer tubular portion 16 moves along the inclined edge portion 50a of the tapered groove 50 of the spacer 23. Subsequently, if the spacer 23 is further inserted, the guiding projection 46 of the outer tubular portion 16 fits into the linear groove 49 of the spacer 23, and the spacer 23 is guided to the depth in the insertion space 14. This guiding operation is performed similarly in whichever direction in the circumferential direction the spacer 23 is shifted. Therefore, the attachment of the spacer 23 can be automatically positioned without accurately positioning the linear groove 49 of the spacer 23 to the guiding projection 46 of the outer tubular portion 16.

In addition, the inner end portion of the guiding projection 46 of the outer tubular portion 16 is formed in a tapered manner so that the inner end portion becomes slightly wider and the linear groove 49 of the spacer 23 is formed in a tapered manner so that the inner end portion becomes lightly wider. Thus, when the spacer 23 is inserted, the guiding projection 46 of the outer tubular portion 16 can easily fit into the linear groove 49 of the spacer 23. As the insertion of the spacer 23 proceeds, an engaging force of the guiding projection 46 with the linear groove 49 becomes larger, rattling no longer occurs. Also, the attachment by insertion of the bulging engagement portion 24 of the spacer 23 to the cutout portion 20 of the outer tubular portion 16 can be realized with accuracy.

Figure 18:
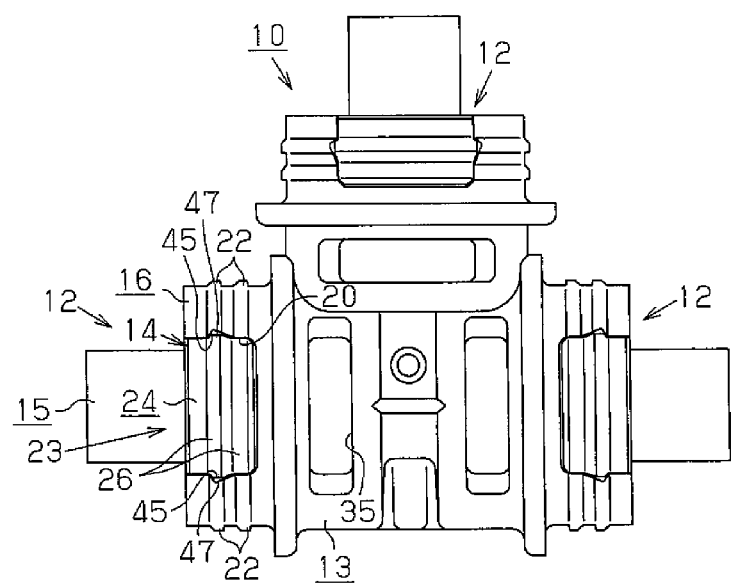
FIG. 18 is a front view illustrating a state where the spacer is inserted into the outer tubular portion of the joint and the engagement member is engaged with the cutout portion.

After that, as illustrated in FIG. 18, by strongly inserting the spacer 23 into the insertion space 14 of the joint 10, the locking projecting spot 47 of the spacer 23 is locked by the locking recess spot 45 of the outer tubular portion 16, and the bulging engagement portion 24 of the spacer 23 is connected to the cutout portion 20 of the outer tubular portion 16. By fitting the cap 29 on the outside of the outer tubular portion 16 in this state, the locking recess 31 in the inner periphery of the cap 29 is engaged with the locking projection 22 on the outer periphery of the spacer 23 and the locking projection 26 on the outer periphery of the bulging engagement portion 24, thereby the cap 29 is attached to the outer tubular portion 16. Then, the plastic pipe 11 is inserted into the insertion space 14 of the joint 10 in this state, and the plastic pipe 11 is connected to the joint 10.

Thus, according to this second embodiment, the following advantages are achieved.

(6) The attachment of the spacer 23 to the joint 10 can be performed easily and rapidly with a simple configuration in which the guiding projection 46 as the guide portion is provided on the inner peripheral surface of the outer tubular portion 16, and the guided groove 48 as the guided portion is provided on the outer peripheral surface of the spacer 23.

(7) By providing the tapered groove 50, which becomes wider toward the inner end in the inner end portion of the guided groove 48, even if the position in the circumferential direction of the bulging engagement portion 24 of the spacer 23 is shifted with respect to the cutout portion 20 of the outer tubular portion 16 when the spacer 23 is attached, the attachment of the spacer 23 to the joint 10 can be performed easily and rapidly.

The above-described embodiment may be modified as follows.

Figure 19:
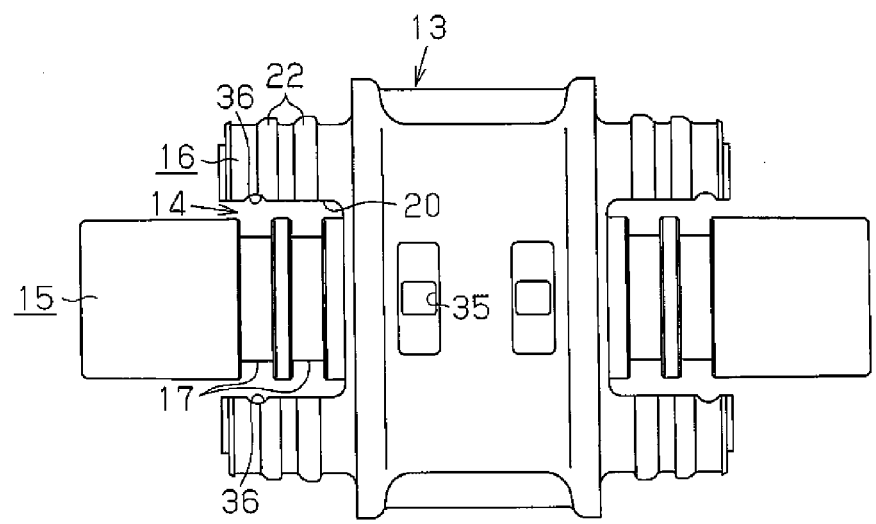
FIG. 19 illustrates a modification of the present invention and is a front view illustrating a joint in which a first engagement recess point is formed in the cutout portion of the outer tubular portion.
Figure 20:
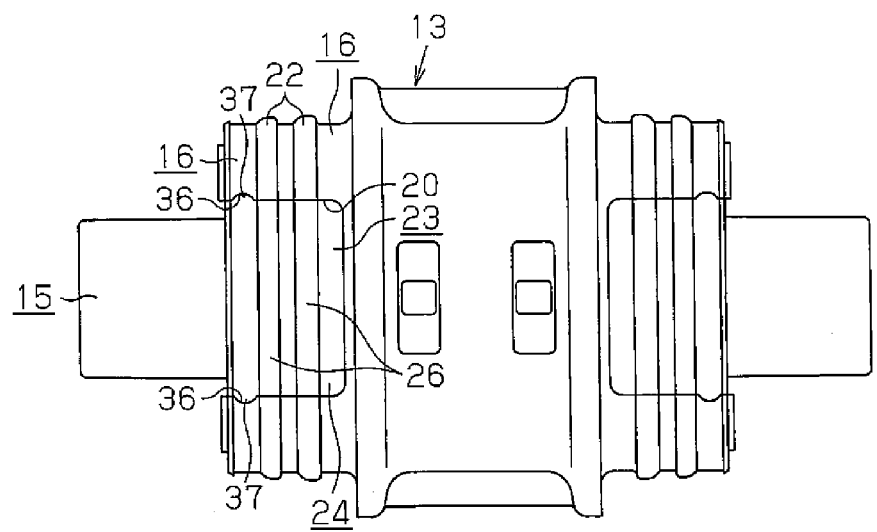
FIG. 20 is a front view illustrating a state where a first engagement projecting spot of a bulging engagement portion of the spacer is engaged with the first engagement recess spot in the cutout portion of the joint of FIG. 19.

As illustrated in FIG. 19, the cutout portion 20 having sides extending in the axial direction of the joint main body 13 is formed on the outer tubular portion 16 of the joint main body 13, and a first engagement recess spot 36 is formed on the outer end of both sides of the cutout portion 20. As illustrated in FIGS. 21(a) and 21(b), a pair of bulging engagement portions 24 is provided at opposite positions separated by 180 degrees on the outer peripheral surface of the outer end portion of the spacer 23. Moreover, a pair of locking projections 26 is provided on the outer periphery of the bulging engagement portion 24. A first engagement projecting spot 37 projecting in the circumferential direction is provided on both sides of the outer end portion. Then, as illustrated in FIG. 20, the spacer 23 is inserted into the insertion space 14 of the joint main body 13, and the first engagement projecting spot 37 of the bulging engagement portion 24 is engaged with the first engagement recess spot 36 of the cutout portion 20 of the outer tubular portion 16. The first engagement recess spot 36 of the outer tubular portion 16 and the first engagement projecting spot 37 of the bulging engagement portion 24 constitute a restricting portion, which prevents the cap 29 from coming undone.

The engagement force of the first engagement recess spot 36 and the first engagement projecting spot 37 can be adjusted by the depth of the first engagement recess spot 36 and the height of the first engagement projecting spot 37 or can be adjusted by providing a plurality of first engagement recess spots 36 and a plurality of first engagement projecting spots 37.

The joint main body 13 in this case can be formed by the injection molding method similarly to the above-described embodiment, but the first engagement recess spot 36 of the outer tubular portion 16 may be also formed by cutting after the joint main body 13 is molded.

If being configured as above, when a withdrawing force acts on the plastic pipe 11, since the first engagement projecting spot 37 of the bulging engagement portion 24 is engaged with the first engagement recess spot 36 of the outer tubular portion 16, the bulging engagement portion 24 coming out of the cutout portion 20 of the outer tubular portion 16 can be suppressed. Therefore, the locked state between the locking recess 31 of the cap 29 and the locking projection 26 of the bulging engagement portion 24 is maintained, and the cap 29 is prevented from coming undone.

Figure 22:
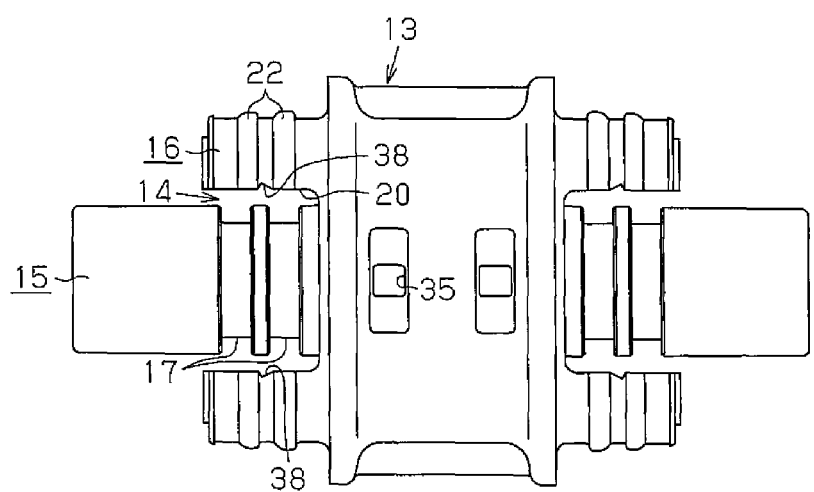
FIG. 22 illustrates another modification of the present invention and is a front view illustrating a joint in which a second engagement recess spot is formed in the cutout portion of the outer tubular portion.

As illustrated in FIG. 22, the cutout portion 20 having sides extending in the axial direction of the joint main body 13 is formed in the outer tubular portion 16 of the joint main body 13, and the second engagement recess spot 38 is formed in the intermediate portion of both sides of the cutout portion 20, that is, between the two locking projections 22. As illustrated in FIG. 25, the second engagement recess spot 38 is formed having a triangular cross section, and a length L2 of its long side 40 is set longer than a length L1 of a short side 41 (L1<L2). Moreover, an angle α formed by the short side 41 and the side portion of the cutout portion 20 is set smaller than 90° (α<90°), and the angle α is set not less than an angle β formed by the long side 40 and the side portion of the cutout portion 20 (α≥β).

As illustrated in FIGS. 24(*a*) and 24(*b*), a pair of the bulging engagement portions 24 is provided at opposite positions separated by 180 degrees on the outer peripheral surface on the outer end portion of the spacer 23, a pair of the locking projections 26 is provided on the outer periphery of the bulging engagement portion 24, and the second engagement projecting spot 39 having a triangular section projecting in the circumferential direction is provided on both sides of the intermediate portion. Then, as illustrated in FIG. 23, the spacer 23 is inserted into the insertion space 14 of the joint main body 13, and the second engagement projecting spot 39 of the bulging engagement portion 24 is engaged with the second engagement recess spot 38 of the cutout portion 20 of the outer tubular portion 16. The second engagement recess spot 38 of the outer tubular portion 16 and the second engagement projecting spot 39 of the bulging engagement portion 24 constitute a restricting portion that prevents the cap 29 from coming undone.

In the case of configuration as above, the cap 29 is prevented from coming undone. Also, since both second engagement recess spots 38 of the bulging engagement portion 24 are formed so that the width becomes smaller as the long sides 40 go toward the inner end, the insertion of the bulging engagement portion 24 into the cutout portion 20 can be performed easily.

It is possible to thin the bulging engagement portion 24 of the spacer 23 by forming a groove or a recess extending in the axial direction of the joint main body 13 as appropriate.

It is possible to omit the cap cover 34 which maintains attachment of the cap 29.

The number of the bulging engagement portions 24 as engagement members may be one or may be three or more.

It is possible to configure the bulging engagement portion 24 separately from the spacer 23.

It is also possible to form the inner tubular portion 15 and the outer tubular portion 16 separately from the joint main body 13 and then, to form them integrally with the joint main body 13 by thermal fusion bonding or adhesion.

It is also possible to configure the joint 10 so that the pipe joint portion 12 becomes two-way, four-way or the like.

It is possible to form the joint main body 13 and the like with synthetic resin (engineering plastic) such as polyacetal (POM), polyphthalamide (PPA), polyphenylsulfone (PPSU) and the like.

As a pipe, it is also possible to use a pipe made of soft metal such as copper pipe and the like, other than the plastic pipe.

It is also possible to use the joint 10 for connection of a pipe for floor heating, a pipe for road heating and the like, other than the pipe for feed-water system and hot-water supply system.

In the above-described second embodiment, the tapered groove 50 of the guided groove 48 of the spacer 23 may be expanding or reduced in size at a portion from the inner end of the outer peripheral surface of the spacer 23 to the bulging engagement portion 24. Moreover, the inclination angle of the inclined edge portion 50*a* of the tapered groove 50 may be increased/decreased as appropriate.

In the second embodiment, the guiding projection 46 as the guide portion of the outer tubular portion 16 and the guided groove 48 as the guided portion of the spacer 23 may be provided at one spot or three spots or more, respectively.

In the second embodiment, the guiding projection 46 as the guide portion of the outer tubular portion 16 may be provided at a part on the outer end of the outer tubular portion 16 or a point-shaped projection may be provided on the inner peripheral surface of the outer end portion of the outer tubular portion 16 instead of the guiding projection 46.

In the second embodiment, a guiding groove as the guide portion may be formed in the outer tubular portion 16 and a guided projection as the guided portion may be provided in the spacer 23.

Figure 21:
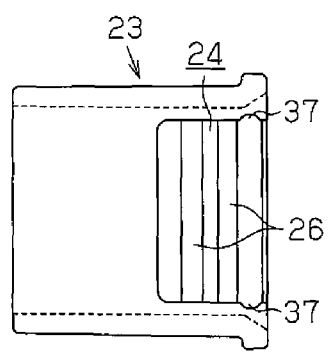
FIG. 21(a) is a front view illustrating a spacer having the bulging engagement portion.
FIG. 21(b) is a right side view illustrating the spacer of FIG. 21(a)
Figure 21:
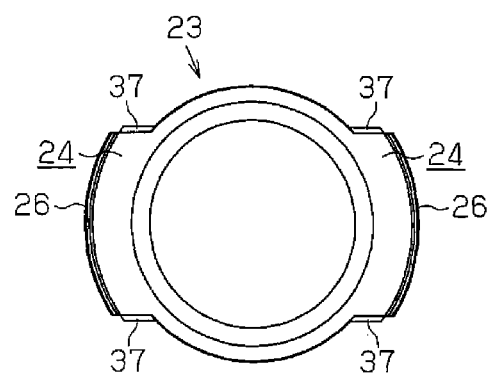

The guided groove 48 and the guiding projection 46 in the second embodiment may be provided in the spacer 23 and the outer tubular portion 16, of the joint 10 of a modification illustrated in FIGS. 19 to 21, the joint 10 of another modification illustrated in FIG. 22, and the joint 10 of another modification illustrated in FIGS. 23 and 24, respectively.

The invention claimed is:

1. A joint comprising:
   a joint main body;
   an inner tubular portion and an outer tubular portion, which are located in the joint main body, and which define an insertion space into which a pipe is insertable;
   a cap fitted on the outside of the outer tubular portion and connected thereto by projection-recess engagement; and
   a retainer mechanism for retaining the pipe, the retainer mechanism located between the outer tubular portion and the cap, wherein,
   a cutout portion is formed in the outer tubular portion,
   an engagement member to engage with the cutout portion is connected to the cap at an outer peripheral portion thereof by the projection-recess engagement, and
   a restricting portion to restrict the cap from coming undone is located between the cutout portion and the engagement member.

2. The joint according to claim 1,
   wherein the restricting portion is composed of a first tapered surface provided on the cutout portion and whose width becomes smaller toward an outer end of the cutout portion and a second tapered surface provided on the engagement member and engaged with the first tapered surface of the cutout portion.

3. The joint according to claim 1, wherein,
   the cutout portion of the outer tubular portion is one of two cutout portion that are provided at opposite positions separated by 180 degrees, and the cutout portions are configured such that the engagement member is engaged with both cutout portions.

4. The joint according to claim 1, wherein the joint main body, in which the inner tubular portion and outer tubular portion are formed of plastic, and the engagement member is made of plastic.

5. The joint according to claim 1, further comprising a spacer, which is configured to be located between the pipe and the outer tubular portion when the pipe is inserted into the insertion space, wherein the engagement member is provided on the spacer.

6. The joint according to claim 5, wherein,
a guide portion is provided on an inner peripheral surface of the outer tubular portion, and
the spacer is engaged with the guide portion and is provided with a guided portion, which guides the engagement member to the cutout portion.

7. The joint according to claim 6, wherein the guide portion is composed of a projection, and the guided portion is composed of a groove.

8. The joint according to claim 7, wherein a tapered groove whose width expands toward an inner end is formed in an inner end portion of the groove.

9. An apparatus comprising a joint; the joint including:
a joint main body;
an inner tubular portion and an outer tubular portion, which are formed in the joint main body, defining an insertion space into which a pipe is insertable;
a cap fitted on the outside of the outer tubular portion and connected thereto by projection-recess engagement; and
a retainer mechanism to retain the pipe, the retainer mechanism located between the outer tubular portion and the cap, wherein,
a cutout portion is defined in the outer tubular portion,
an engagement member to engage with the cutout portion is connected to the cap at an outer peripheral portion thereof by the projection-recess engagement,
a restricting portion to restrict the cap from coming undone is located between the cutout portion and the engagement member, and
a spacer, configured to be located between the outer tubular portion and the pipe while inserted into the insertion space, the spacer comprising a guided portion, which is engaged with a guide portion provided on an inner peripheral surface of the outer tubular portion to guide the engagement member to the cutout portion.

10. The apparatus according to claim 9, wherein the guide portion comprises a projection and the guided portion is comprises a groove.

11. The apparatus according to claim 10, wherein a tapered groove whose width expands toward an inner end is located on an inner end portion of the guided groove.

* * * * *

UNITED STATES PATENT AND TRADEMARK OFFICE
CERTIFICATE OF CORRECTION

PATENT NO.         : 8,746,752 B2                                       Page 1 of 1
APPLICATION NO.    : 13/640265
DATED              : June 10, 2014
INVENTOR(S)        : Hayashi et al.

It is certified that error appears in the above-identified patent and that said Letters Patent is hereby corrected as shown below:

In the Claims

In column 14 line 20, in Claim 10, after "portion", delete "is", therefor

Signed and Sealed this
Ninth Day of December, 2014

Michelle K. Lee
*Deputy Director of the United States Patent and Trademark Office*